United States Patent
Wang et al.

(10) Patent No.: US 11,538,164 B2
(45) Date of Patent: *Dec. 27, 2022

(54) COUPLED MULTI-TASK FULLY CONVOLUTIONAL NETWORKS USING MULTI-SCALE CONTEXTUAL INFORMATION AND HIERARCHICAL HYPER-FEATURES FOR SEMANTIC IMAGE SEGMENTATION

(71) Applicant: Intel Corporation, Santa Clara, CA (US)

(72) Inventors: Libin Wang, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/124,064

(22) Filed: Dec. 16, 2020

(65) Prior Publication Data
US 2021/0192740 A1 Jun. 24, 2021

Related U.S. Application Data

(63) Continuation of application No. 16/320,944, filed as application No. PCT/CN2016/096707 on Aug. 25, 2016, now Pat. No. 10,929,977.

(51) Int. Cl.
*G06V 10/00* (2022.01)
*G06T 7/10* (2017.01)
(Continued)

(52) U.S. Cl.
CPC ............... *G06T 7/10* (2017.01); *G06F 16/55* (2019.01); *G06N 3/0454* (2013.01); *G06N 3/08* (2013.01);
(Continued)

(58) Field of Classification Search
CPC .... G06K 9/00973; G06K 9/34; G06K 9/4628; G06K 9/00718; G06K 9/00797;
(Continued)

(56) References Cited

U.S. PATENT DOCUMENTS 8,442,927 B2 * 5/2013 Chakradhar ........... G06N 3/063 712/15
9,858,525 B2 * 1/2018 Dai ...................... G06K 9/6273
(Continued)

FOREIGN PATENT DOCUMENTS

CN 104463241 3/2015
CN 105512661 4/2016

OTHER PUBLICATIONS

International Preliminary Report on Patentability for PCT Application No. PCT/CN16/96707, dated Mar. 7, 2019.
(Continued)

*Primary Examiner* — Amir Alavi
(74) *Attorney, Agent, or Firm* — Essential Patents Group, LLP.

(57) ABSTRACT

Techniques related to implementing fully convolutional networks for semantic image segmentation are discussed. Such techniques may include combining feature maps from multiple stages of a multi-stage fully convolutional network to generate a hyper-feature corresponding to an input image, up-sampling the hyper-feature and summing it with a feature map of a previous stage to provide a final set of features, and classifying the final set of features to provide semantic image segmentation of the input image.

20 Claims, 6 Drawing Sheets

(51) Int. Cl.
*G06N 3/04* (2006.01)
*G06N 3/08* (2006.01)
*G06T 7/11* (2017.01)
*G06T 7/143* (2017.01)
*G06V 10/26* (2022.01)
*G06V 10/94* (2022.01)
*G06V 10/44* (2022.01)
*G06F 16/55* (2019.01)
*G06N 5/04* (2006.01)

(52) U.S. Cl.
CPC ............... *G06N 5/046* (2013.01); *G06T 7/11* (2017.01); *G06T 7/143* (2017.01); *G06V 10/26* (2022.01); *G06V 10/454* (2022.01); *G06V 10/94* (2022.01); *G06T 2207/10016* (2013.01); *G06T 2207/10024* (2013.01); *G06T 2207/20016* (2013.01); *G06T 2207/20081* (2013.01)

(58) Field of Classification Search
CPC ....... G06T 7/10; G06T 7/0081; G06T 7/0083; G06T 7/11; G06T 7/143; G06T 2207/20081; G06T 2207/20144; G06F 16/55; G06F 17/30257; G06F 17/3024; G06N 3/0454; G06N 3/08; G06N 5/046; G06N 3/02; H04N 1/40062
See application file for complete search history.

(56) References Cited

U.S. PATENT DOCUMENTS

| | | | |
|---|---|---|---|
| 9,916,522 B2* | 3/2018 | Ros Sanchez | ....... G06K 9/6277 |
| 9,940,539 B2* | 4/2018 | Han | ......... G06N 3/08 |
| 9,990,728 B2* | 6/2018 | Shen | ......... G06T 7/50 |
| 10,133,938 B2* | 11/2018 | Kim | ......... B60C 9/00 |
| 10,325,202 B2* | 6/2019 | Towal | ....... G06N 7/005 |
| 10,430,946 B1* | 10/2019 | Zhou | ......... G06T 7/11 |
| 10,452,959 B1* | 10/2019 | Gautam | ................. G06V 10/82 |
| 10,929,977 B2* | 2/2021 | Wang | ....... G06T 7/143 |
| 2015/0293976 A1* | 10/2015 | Guo | .................. G06F 16/9535 |
| | | | 707/706 |
| 2018/0204076 A1 | 7/2018 | Tripathi et al. | |
| 2019/0164290 A1* | 5/2019 | Wang | .................. G06V 10/94 |
| 2019/0213388 A1 | 7/2019 | Makeev et al. | |

OTHER PUBLICATIONS

International Search Report and Written Opinion for International Patent Application No. PCT/CN2016/096707 dated Jun. 7, 2017.
Non-Final Office Action for U.S. Appl. No. 16/320,944, dated Jun. 10, 2020.
Notice of Allowance for U.S. Appl. No. 16/320,944, dated Oct. 30, 2020.
Chen, et al., "Semantic Image Segmentation with Deep Convolutional Nets and Fully Connected CRFs", Published as a conference paper at ICLR 2015.
Dai, et al., "Instance-aware Semantic Segmentation via Multi-task Network Cascades", Computer Vision and Pattern Recognition; 2015.
Long, Jonathan et al., "Fully Convolutional Networks for Semantic Segmentation", CVPR, Dec. 31, 2015.
Noh, et al., "Learning Deconvolution Network for Semantic Segmentation", Computer Vision and Pattern Recognition; pp. 1520-1528; 2015.

* cited by examiner

COUPLED MULTI-TASK FULLY CONVOLUTIONAL NETWORKS USING MULTI-SCALE CONTEXTUAL INFORMATION AND HIERARCHICAL HYPER-FEATURES FOR SEMANTIC IMAGE SEGMENTATION

CLAIM OF PRIORITY

This Application is a Continuation of U.S. patent application Ser. No. 16/320,944, filed Jan. 25, 2019, which is a National Stage Entry of, and claims priority to, PCT Application No. PCT/CN2016/096707, filed on Aug. 25, 2016 and titled "COUPLED MULTI-TASK FULLY CONVOLUTIONAL NETWORKS USING MULTI-SCALE CONTEXTUAL INFORMATION AND HIERARCHICAL HYPER-FEATURES FOR SEMANTIC IMAGE SEGMENTATION", which are incorporated by reference in their entireties for all purposes.

BACKGROUND

Semantic image segmentation (SIS) is used to predict pixel-wise category labels in images or video frames. Unlike object classification or detection, SIS obtains semantic labels for every pixel of an image or frame, not just image-wise labels. Therefore, SIS plays an important role as an independent component in numerous computer vision tasks such as object tracking, scene understanding, and human-machine interaction. Such techniques and systems may be applied in products such as unmanned vehicles (e.g., drones or cars), somatosensory gaming, and robot vision. Fast and accurate semantic image segmentation technology is, therefore, of great significance.

Deep convolutional neural networks have attracted attention in many fields including computer vision, pattern recognition, and big data analysis. Current techniques may be based on deep fully convolutional networks (FCN) that deploy an end-to-end model jointly predicting labels of all pixels in an image. Further techniques include using conditional random fields to smooth the spatial prediction results from the FCN, symmetric de-convolution networks to discover small scale objects, and multi-task learning frameworks that include object detection, 2-class background segmentation and classification in order. However, such techniques suffer from various drawbacks including increased computational costs and the like.

It may be advantageous to perform semantic image segmentation with high accuracy and with less computational and memory resource requirements. It is with respect to these and other considerations that the present improvements have been needed. Such improvements may become critical as the desire to perform semantic image segmentation and using the resultant semantic segmented images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
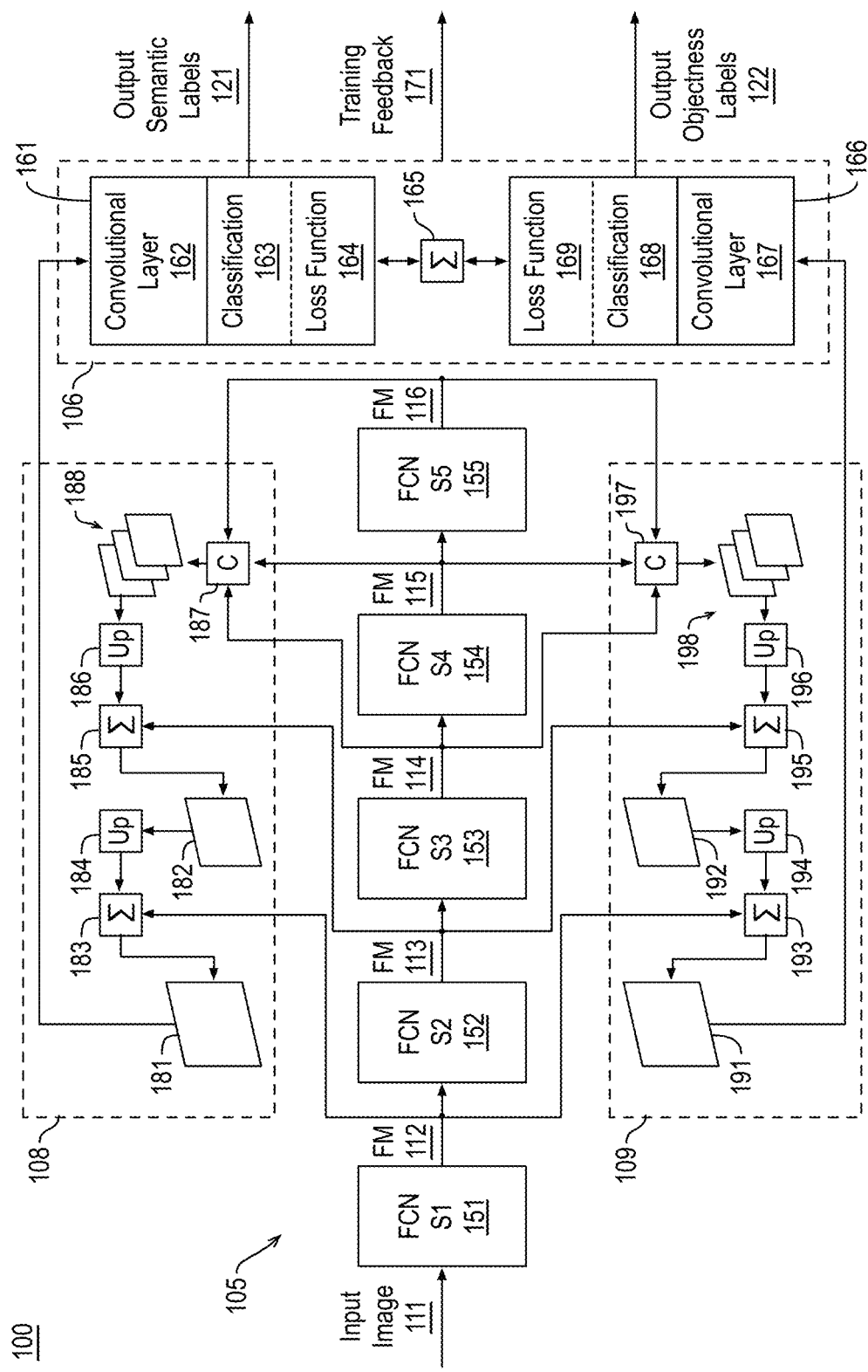
FIG. 1 illustrates an example semantic image segmentation system for performing semantic image segmentation.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein.

Methods, devices, apparatuses, computing platforms, and articles are described herein related to performing semantic image segmentation using fully convolutional networks.

As described above, it may be advantageous to perform semantic image segmentation (SIS) with high accuracy and with less computational and memory resource requirements. The techniques discussed herein perform SIS using a coupled multi-task (CMT) fully convolutional network (FCN) incorporating multi-scale contextual (MC) information and hierarchical hyper-features (HH) (CMT-MCHH). The discussed CMT-MCHH systems and techniques divide the SIS task into two coupled steps: learning a 2-class objectness mask and classifying C-class (e.g., C being the number of total classes) semantic labels. Such a divide and conquer strategy may efficiently remove the interference of image or video frame backgrounds. Furthermore, the discussed CMT-MCHH systems and techniques may take different scales of contextual information into consideration (e.g., during training), which can effectively capture both global and local feature of objects. Also, the discussed CMT-MCHH systems and techniques may deploy multi-scale hyper-features, which can recognize objects of different scale sizes. The discussed systems and techniques provide high performance, strong generalization capacity, and a small memory footprint. During an implementation phase, the discussed CMT-MCHH systems and techniques may receive an input image (e.g., from a memory or other image or video source) and provide a semantic image segmentation of the input (e.g., the semantic image segmentation including pixel-level category labels for pixels of the input image) and/or an objectness image segmentation of the input (e.g., the objectness image segmentation including pixel-level object or non-object labels for pixels of the input image).

In some embodiments discussed herein, semantic image segmentation may include training a fully convolutional network system using training images (e.g., in a training phase) and implementing the trained fully convolutional network system in an implementation or testing phase. During implementation, the fully convolutional network system may implement, by a multi-stage fully convolutional network, a number of stages based on an input image. The stages may generate one or more feature maps corresponding to the input image such that successive stages provide feature maps at lower and lower resolutions. Furthermore, feature maps from two or more later or middle stages of the multi-stage fully convolutional network may be combined (e.g., concatenated) to provide a hyper-feature corresponding to the input image. The hyper-feature, having a lower resolution than previous stages, is up-sampled to the higher resolution of a previous stage and summed with the output from the previous stage. The process of up-sampling and summing may be repeated any number of times to generate a final set of features corresponding to the input image. Such techniques provide for a hierarchical hyper-feature (HH) architecture for detecting small objects in images. The final set of features is then evaluated to provide a semantic image segmentation of the input image. For example, the evaluation may include application of a convolutional layer and a classifier. The semantic image segmentation includes pixel-level category labels and/or pixel-level probabilities of labels for pixels of the input image.

Furthermore, during implementation, the discussed hyper-feature process may also be performed for an objectness classification. In an embodiment, the discussed hyper-feature may be used for both semantic image segmentation and objectness classification. In an embodiment, the hyper-feature process or network for objectness classification is different (e.g., different stages may be used, different interpolations may be provided and so on). The second hyper-feature may be used to perform a fused objectness classification and semantic image segmentation. For example, the second hyper-feature may be provided to a convolutional layer trained for objectness classification and the results of the objectness classification convolutional layer and the semantic image segmentation discussed above may be summed or the results from a objectness classification classifier and the semantic image segmentation classifier discussed above may be summed. Based on the summation, the classifications may work together (e.g., in a fused manner) to provide most likely object labels for the pixels. For example, a semantic image segmentation label that provide a high confidence label (e.g., person or animal or the like) for a pixel may be mitigated by an objectness classification indicating the pixel is not an object. Similarly, a pixel with an objectness classification indicating a high likelihood a pixel is an object may be labeled with the highest confidence semantic image segmentation label even though the confidence is relatively low.

During the training phase, the discussed fully convolutional network system may be trained with coupled multi-task learning (CMT). As discussed, the fully convolutional network system may include two tasks (e.g., semantic image segmentation labeling and objectness classification labeling). During training, the loss function for the semantic image segmentation labeling and the objectness classification labeling may be fused such that the two tasks share a fully convolutional neural network and the two tasks supplement one another in training. Such training improves the performance of the trained fully convolutional network system significantly while reducing complexity. The loss functions may be fused using any suitable technique or techniques such as applying a first weighting to the semantic image segmentation labeling loss function and a second weighting to the objectness classification labeling loss function and summing the weighted loss functions.

Also during training, the two task networks may be trained with multi-scale contextual (MC) images. First, small scale images are cropped from the training images to train the multi-stage fully convolutional network of the fully convolutional neural network system. Then, large scale images (e.g., images larger than the smaller images) are cropped from the training images to refine the training of the fully convolutional neural network system. Such techniques offer the advantage of combining local and global features of objects in the training of the fully convolutional neural network. Furthermore, the training of the fully convolutional network system may continue with training the hyper-feature networks discussed above. Finally, the entire fully convolutional network system (e.g., multi-stage fully convolutional network, semantic image segmentation hyper-feature network, and objectness classification labeling hyper-feature network) is trained in an end-to-end manner based on the training images to finalize the fully convolutional neural network system.

Such a coupled multi-task fully convolutional network system incorporating multi-scale contextual and hierarchical hyper-feature (CMT-MCHH) techniques offer enhanced performance and a small model size. The results during implementation, a semantic image segmentation and/or objectness segmentation of an input image, have a wide range of uses in object tracking, scene understanding, human-machine interaction, unmanned vehicles (e.g., drones or cars), somatosensory gaming, robot vision, and so on.

FIG. 1 illustrates an example semantic image segmentation system 100 for performing semantic image segmentation, arranged in accordance with at least some implementations of the present disclosure. As shown in FIG. 1, semantic image segmentation system 100 may include a multi-stage fully convolutional network 105, a semantic label hyper-feature network 108, an objectness label hyper-feature network 109, and a fused semantic and objectness classification module 106. Semantic image segmentation system 100 may be implemented by any suitable form factor device such as a server, a personal computer, a laptop computer, a tablet, a phablet, a smart phone, a digital camera, a gaming console, a wearable device, a display device, an all-in-one device, a two-in-one device, or the like. For example, semantic image segmentation system 100 may perform semantic image segmentation and/or other computer vision tasks as discussed herein. Semantic image segmentation system 100 may provide a deep learning system having a fully convolutional network using multi-task learning, multi-scale contextual information, and hierarchical hyper-features.

Also as shown, multi-stage fully convolutional network 105 may include fully convolutional network stages such as a first fully convolutional network stage 151, a second fully convolutional network stage 152, a third fully convolutional network stage 153, a fourth fully convolutional network stage 154, and a fifth fully convolutional network stage 155. In the illustrated example, multi-stage fully convolutional network 105 has five stages. However, multi-stage fully convolutional network 105 may have any number of stages. As shown, multi-stage fully convolutional network 105 receives an input image 111 and the stages of multi-stage fully convolutional network 105 provide feature maps 112, 113, 114, 115, 116, respectively. Input image 111 may include any suitable input image of any suitable size. For example, input image 111 may be an image in the red, green, blue (RGB) color space such that input image 111 has N×M pixels each represented by three values corresponding to the three RGB color channels. In an embodiment, input image 111 has a resolution of 320×320. Although discussed with respect to the RGB color space, the input pixel values may be in any suitable color space such as the YUV (Y luminance, U chroma, and V chroma) color space, the YCbCr (luminance, blue difference, and red difference) color space, the CMYK (cyan, magenta, yellow, key or black) color space, or the like. Multi-stage fully convolutional network 105 may receive image data 103 from an image sensor, an image processor, a memory, or any other source Each of convolutional network stages 151-155 may include any number of convolutional layers, rectified linear units, max pooling layers, local response normalization layers, or the like. In an embodiment, first stage 151 includes two fully convolutional layers followed by a max pooling layer, second stage 152 includes two fully convolutional layers followed by a max pooling layer, third stage 153 includes three fully convolutional layers followed by a max pooling layer, fourth stage 154 includes three fully convolutional layers followed by a max pooling layer, and fifth stage 155 includes three fully convolutional layers followed by a max pooling layer. Network stages 151-155 may include other optional layers (e.g., rectified linear units and/or local response normalization) and network stages 151-155 any suitable fully convolutional layers and/or stages. Furthermore, multi-stage fully convolutional network 105 and semantic image segmentation system 100 may be characterized as a fully convolutional network or system as it does not include any fully connected neural network layers.

As shown, first stage 151 outputs a feature map or maps 112. For example, first stage 151 may apply one or more convolutional layers and a max pooling layer or the like based on input image 111 to generate feature maps 112. In an embodiment, first stage 151 applies two convolutional layers and a max pooling layer based on input image 111 to generate feature maps 112. In an embodiment, feature maps 112 include a set of feature maps each at a resolution less than that of input image 111. Furthermore, for each pixel location of a feature map, feature maps 112 may include multiple channels corresponding to a number of convolutional filters applied in first stage 151. For example, if 100 filters are applied at first stage 151 with max pooling that reduces the resolution by one half in each dimension, feature maps 112 may include 100 feature maps each having a resolution of ½N×½M. In an embodiment, feature maps 112 have a resolution of 160×160. Feature maps 112 and any other feature maps discussed herein may be characterized as a feature map, a set of feature maps, a response map, a set of response maps, or the like.

Second stage 152 may receive feature maps 112 and second stage 152 outputs a feature map or maps 113. For example, second stage 152 may apply one or more convolutional layers and a max pooling layer or the like based on feature maps 112 to generate feature maps 113. In an embodiment, second stage 152 applies two convolutional layers and a max pooling layer to generate feature maps 113. In an embodiment, feature maps 113 include a set of feature maps each at a resolution less than that of feature maps 112. Furthermore, for each pixel location of a feature map, feature maps 113 may include multiple channels corresponding to a number of convolutional filters applied in second stage 152. For example, if 50 filters are applied at second stage 152 with max pooling that reduces the resolution by one half in each dimension, feature maps 113 may include 50 feature maps each having a resolution of ¼N×¼M. In an embodiment, feature maps 113 have a resolution of 80×80.

Similarly, third stage 153 may receive feature maps 113 and third stage 153 outputs a feature map or maps 114. For example, third stage 153 may apply one or more convolutional layers and a max pooling layer or the like based on feature maps 113 to generate feature maps 114. In an embodiment, third stage 153 applies three convolutional layers and a max pooling layer to generate feature maps 114. In an embodiment, feature maps 114 include a set of feature maps each at a resolution less than that of feature maps 113. Furthermore, for each pixel location of a feature map, feature maps 114 may include multiple channels corresponding to a number of convolutional filters applied in second stage 152. For example, if 25 filters are applied at third stage 152 with max pooling that reduces the resolution by one half in each dimension, feature maps 114 may include 50 feature maps each having a resolution of ⅛N×⅛M. In an embodiment, feature maps 114 have a resolution of 40×40.

Furthermore, fourth stage 154 may receive feature maps 114 and fourth stage 154 outputs a feature map or maps 115. For example, fourth stage 154 may apply one or more convolutional layers based on feature maps 114 to generate feature maps 115. In an embodiment, fourth stage 154 applies three convolutional layers to generate feature maps 115. In an embodiment, feature maps 115 include a set of feature maps each at a resolution equal to that of feature maps 114. In an embodiment, feature maps 115 have a resolution of 40×40. Furthermore, for each pixel location of a feature map, feature maps 115 may include multiple channels corresponding to a number of convolutional filters applied as discussed above. Similarly, fifth stage 155 may receive feature maps 115 and fifth stage 155 outputs a feature map or maps 116. For example, fifth stage 155 may apply one or more convolutional layers based on feature maps 115 to generate feature maps 116. In an embodiment, fifth stage 155 applies three convolutional layers to generate feature maps 116. In an embodiment, feature maps 116 include a set of feature maps each at a resolution equal to that of feature maps 114 and feature maps 115. In an embodiment, feature maps 116 have a resolution of 40×40. Furthermore, for each pixel location of a feature map, feature maps 115 may include multiple channels corresponding to a number of convolutional filters applied as discussed above.

Also as shown in FIG. 1, feature maps 112-116 are provided to semantic label hyper-feature network 108. Semantic label hyper-feature network 108 receives feature maps 112-116 and generates a final set of features 181 for semantic segmentation. In an embodiment, feature maps 114, 115, 116 are combined by a combiner 187 to generate hyper-feature 188. For example, feature maps 114, 115, 116 may be concatenated to generate hyper-feature 188. For example, as discussed, feature maps 114, 115, 116 are of the same resolution due to pooling layers (e.g., max pooling layers) of the stages of multi-stage fully convolutional network 105 decreasing the resolution of feature maps through third stage 153. By combining feature maps 114, 115, 116 from middle layers or stages of multi-stage fully convolutional network 105 to generate hyper-feature 188, features corresponding to small scale objects in input image 111 may be maintained such that the small scale objects are not lost by multi-stage fully convolutional network 105.

Hyper-feature 188 may include multiple feature maps or a single map with multiple channels or the like. As shown, hyper-feature 188 may be provided to an up-sampler 186, which may up-sample hyper-feature 188 to the resolution of feature maps 113. The up-sampled hyper-feature may be provided to an adder 185 to generate an up-sampled and summed features 182. The up-sampling and summing may be performed using any suitable technique or techniques. For example, up-sampler 186 may apply an up-sample filter and/or refinement filtering. In an embodiment, the resolution and channel depth of the up-sampled hyper-feature may match the resolution and channel depth of feature map 113 such that adder 185 sums, in a pixel-wise and channel-wise manner, the values of the up-sampled hyper-feature and the values of feature map 113.

Up-sampled and summed features 182 may be provided to an up-sampler 184, which may up-sample up-sampled and summed features 182 to the resolution of feature maps 112. The up-sampled features may be provided to an adder 183 to generate up-sampled and summed features characterized as final set of features 181. The up-sampling and summing may be performed using any suitable technique or techniques. For example, up-sampler 184 may apply an up-sample filter and/or refinement filtering. In an embodiment, the resolution and channel depth of up-sampled and summed features 182 may match the resolution and channel depth of feature map 112 such that adder 185 sums, in a pixel-wise and channel-wise manner, the values of the up-sampled hyper-feature and the values of feature map 113.

Although discussed with respect to three feature maps 114, 115, 116 being combined to generate hyper-feature 188, any number of feature maps (e.g., two, four, or more) may be combined or concatenated. Furthermore, semantic image segmentation system 100 illustrates feature maps 114, 115, 116 having the same resolution being combined. However, prior to being combined, any of such feature maps may be up-sampled or down-sampled as needed to provide the same resolution across the feature maps. Further still, semantic image segmentation system 100 illustrates two up-sampling and summing operations to incorporate previous stage feature maps into final set of features 181. However, the discussed up-sampling and summing operations may be performed any number of times such as once, three times, or more depending on number of stages of multi-stage fully convolutional network 105 and/or the architecture thereof. For example, such up-sampling and summing operations may not be performed for each stage such that stages may be skipped or the like.

With continued discussion of FIG. 1, feature maps 112-116 are also provided to objectness label hyper-feature network 109. Objectness label hyper-feature network 109 receives feature maps 112-116 and generates a final set of features 191 for objectness segmentation. In an embodiment, feature maps 114, 115, 116 are combined by a combiner 197 to generate hyper-feature 198. For example, feature maps 114, 115, 116 may be concatenated to generate hyper-feature 198. As discussed, feature maps 114, 115, 116 are of the same resolution due to pooling layers (e.g., max pooling layers) and, by combining feature maps 114, 115, 116 from middle layers or stages of multi-stage fully convolutional network 105 to generate hyper-feature 198, features corresponding to small scale objects in input image 111 may be maintained.

Hyper-feature 198 may include multiple feature maps or a single map with multiple channels or the like and hyper-feature 198 may be provided to an up-sampler 196, which may up-sample hyper-feature 198 to the resolution of feature maps 113. The up-sampled hyper-feature may be provided to an adder 195 to generate an up-sampled and summed features 192. The up-sampling and summing performed by objectness label hyper-feature network 109 may be performed using any suitable technique or techniques such as those discussed with respect to semantic label hyper-feature network 108. Up-sampled and summed features 192 may be provided to an up-sampler 194, which may up-sample up-sampled and summed features 192 to the resolution of feature maps 112 and the up-sampled features may be provided to an adder 193 to generate up-sampled and summed features characterized as final set of features 191.

Although discussed with respect to feature maps 112, 113, 114, 115, 116 being used to generate final set of features 191 in a manner analogous to that of semantic label hyper-feature network 108, objectness label hyper-feature network 109, objectness label hyper-feature network 109 may generate final set of features 191 using any suitable technique or techniques. For example, semantic label hyper-feature network 108 and objectness label hyper-feature network 109 may be the same (e.g., such that one may be eliminated as redundant), they may utilize different up-sampling filters and/or refinement filters, or they may use different architectures. For example, semantic label hyper-feature network 108 and objectness label hyper-feature network 109 may combine different feature maps to generate their respective hyper-features. In addition or in the alternative, they may use differing numbers of up-sampling and summing operations to incorporate previous stage feature maps or the like. For example, objectness label hyper-feature network 109 may skip stages while semantic label hyper-feature network 108 performs up-sampling and summing for each stage of multi-stage fully convolutional network 105.

Discussion now turns to fused semantic and objectness classification module 106. As shown, fused semantic and objectness classification module 106 receives final set of features 181 and final set of features 191. Fused semantic and objectness classification module 106 includes a semantic labels classification module 161 and an objectness labels classification module 166. During a training phase, semantic labels classification module 161 includes convolutional layer 162, any other intervening layers, and loss function module 164 and objectness labels classification module 166 includes convolutional layer 167, any other intervening layers, and loss function module 169. As discussed, semantic image segmentation system 100 provides an end-to-end system for performing two tasks: semantic labeling and objectness labeling. That is, semantic label hyper-feature network 108 and semantic labels classification module 161 perform a C-class semantic label task (C being the number of classifications being implemented) and objectness label hyper-feature network 109 and objectness labels classification module 166 perform a 2-class label task (either object or non-object).

During the training phase, loss function module 164 and loss function module 169 are fused to provide training for semantic image segmentation system 100. For example, a loss function may be defined for the semantic labeling task and another loss function may be defined for the objectness labeling task. For example, semantic image segmentation system 100 may be provided training images as input image 111 to generate labeling results (both semantic and objectness labels). The results during training may be compared to ground truth labels (again for both semantic and objectness labels) and the fused loss functions may minimized over the training. In an embodiment, the two loss functions may be weighted and summed by adder 165 over the training images. The resultant loss values or parameters are provided as training feedback 171 and the fused loss functions may be minimized over the training images and sub-regions from cropping of the training images (as discussed further below) to train and generate semantic image segmentation system 100.

For example, given m training images labeled $y_1$ with features z, the fused loss functions may be weighed by weighting values $w_1$, $w_2$ and fused or summed as shown below with respect to Equation (1):

$$L(\theta) = -\frac{1}{m}\sum_{i=1}^{m}\left(w_1\sum_{j=1}^{C}1\left[y_1^{(i)}=j\right]\log\frac{e^{\theta_j^T x^{(i)}}}{\sum_{l=1}^{C}e^{\theta_l^T x^{(i)}}} + w_2\sum_{j=1}^{2}1\left[y_1^{(i)}=j\right]\log\frac{e^{\theta_j^T x^{(i)}}}{\sum_{l=1}^{2}e^{\theta_l^T x^{(i)}}}\right) \quad (1)$$

such that Equation (2) below provides a loss function for semantic labeling and Equation (3) below provides a loss function for objectness labeling.

$$\sum_{j=1}^{C}1\left[y_1^{(i)}=j\right]\log\frac{e^{\theta_j^T x^{(i)}}}{\sum_{l=1}^{C}e^{\theta_l^T x^{(i)}}} \quad (2)$$

$$\sum_{j=1}^{2}1\left[y_1^{(i)}=j\right]\log\frac{e^{\theta_j^T x^{(i)}}}{\sum_{l=1}^{2}e^{\theta_l^T x^{(i)}}} \quad (3)$$

The discussed weights may include any suitable values. In an embodiment, the weights sum to one. In an embodiment, the weight applied to the semantic segmentation loss function is greater than the weight applied to the objectness segmentation loss function. In an embodiment, the weight applied to the semantic segmentation loss function is twice the weight applied to the objectness segmentation loss function. The discussed fusing of loss functions provides coupled multi-task (CMT) learning for semantic image segmentation system 100 across semantic labeling and objectness labeling. Thereby, the two tasks (semantic labeling and objectness labeling) are coupled by sharing multi-stage fully convolutional network 105 and by training as discussed. For example, semantic label hyper-feature network 108 and semantic labels classification module 161 (e.g., a semantics labeling network or the like) and objectness label hyper-feature network 109 and objectness labels classification module 166 (e.g., an objectness labeling network or the like) may supplement each other via such fusing or summation to reduce the complexity of the semantic image segmentation task and to provide higher accuracy semantic image segmentation.

Furthermore, during the training phase of semantic image segmentation system 100, multi-scale contextual image training may be provided. For example, during training, small scale images (e.g., small sub-regions cropped from training images) are used to train an initial multi-stage fully convolutional network 105 and/or other portions of semantic image segmentation system 100. Such training of multi-stage fully convolutional network 105 may be characterized as initial training or local training or the like. For example, such training may include training based on local features of the training images.

Next, large scale images (e.g., larger regions cropped from training images and/or the full size training images themselves) are used to train the initial multi-stage fully convolutional network 105 and/or other portions of semantic image segmentation system 100. The large scale image training may provide additional rich contextual information to train a global multi-stage fully convolutional network 105 and/or other portions of semantic image segmentation system 100. For example, such training may include training based on global features of the training images. Such training may be provided such that all large scale images are larger than all small scale images. Furthermore, the cropping of the training mages to generate the small and large scale training sub-regions or images may be performed using any suitable technique or techniques such as randomly cropping the training images or the like. Although discussed with respect to two level training (e.g., large and small sub-regions), any number of levels such as three or four may be used such that each subsequent training increases the sizes of the sub-regions. Such multi-scale contextual (MC) image training offers the advantages of detection with different context information may combining global and local features of objects.

Figure 2:
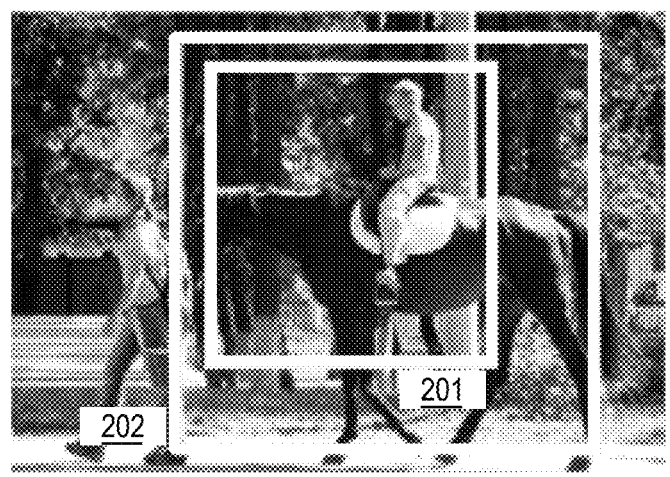
FIG. 2 illustrates example small and large sub-regions of a training image for training semantic image segmentation system.

FIG. 2 illustrates example small and large sub-regions of a training image 211 for training semantic image segmentation system 100, arranged in accordance with at least some implementations of the present disclosure. As shown in FIG. 2, training image 211 may include any suitable image for training semantic image segmentation system 100 such as an image including objects of the classification labels to be trained such as people, animals, horses, birds, bikes, planes, automobiles, boats, background, and so on. Furthermore, some training images may include objects that do not correspond to the classification labels. As discussed herein, any number or C-classification labels may be provided.

Figure 3:
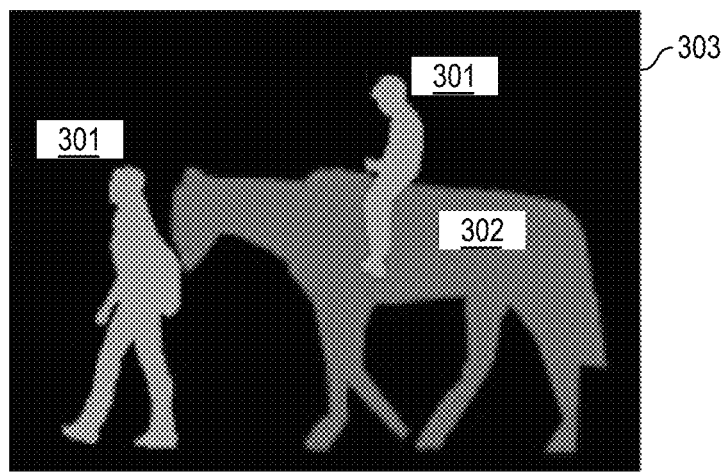
FIG. 3 illustrates example ground truth semantic labels corresponding to a training image.

FIG. 3 illustrates example ground truth semantic labels 311 corresponding to training image 211, arranged in accordance with at least some implementations of the present disclosure. As shown in FIG. 3, ground truth semantic labels 311 include labels 301 corresponding to a person, labels 302 corresponding to a horse or animal, and labels 303 corresponding to no object. Although discussed with respect to labels of person, horse or animal, and no object, any suitable labels may be used such as more generic labels, more specific labels, numeric labels that are indexed to descriptive labels, or the like. As can be seen with respect to FIG. 2, ground truth semantic labels 311 provide accurate labels to each pixel of training image 211. Such ground truth semantic labels 311 may be provided using any suitable technique or techniques such as by hand labeling or the like.

Figure 4:
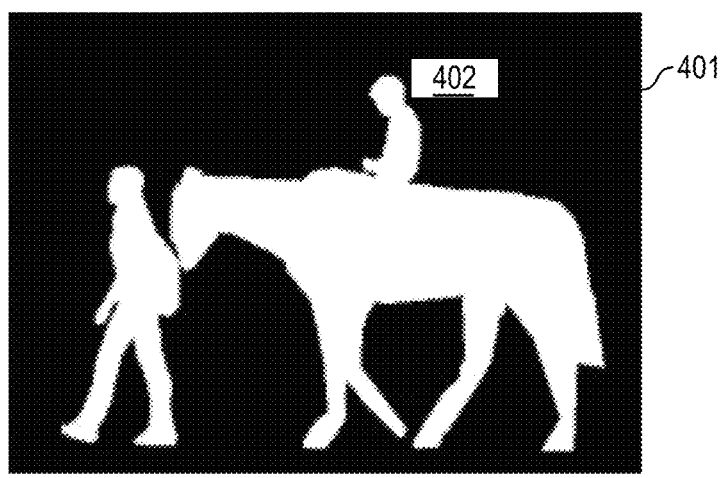
FIG. 4 illustrates example ground truth objectness labels corresponding to a training image.

FIG. 4 illustrates example ground truth objectness labels 411 corresponding to training image 211, arranged in accordance with at least some implementations of the present disclosure. As shown in FIG. 4, ground truth objectness labels 411 include labels 401 corresponding to non-object, not an object, background or the like and labels 402 corresponding to object, object of interest, foreground, or the like. As shown, ground truth objectness labels 411 provide a binary map of training image 211 indicating on a pixel-by-pixel basis whether the pixel corresponds to an object to be labeled or not. For example, values of 1 may be provided for pixels with an object to be labeled and values 0 may be provided for pixels without an object to be labeled. As can be seen with respect to FIG. 2, ground truth objectness labels 411 provide accurate labels to each pixel of training image 211. Such ground truth semantic labels 311 may be provided using any suitable technique or techniques such as by hand labeling or the like.

With reference to FIGS. 1 and 2, during the training phase, smaller sub-regions such as small sub-region 201 of training images such as training image 211 may be provided, along with corresponding ground truth semantic and objectness information, during the initial training of multi-stage fully convolutional network 105 and/or other portions of semantic image segmentation system 100. For example, training image 211 may be cropped randomly to generate small sub-region 201 and/or other small sub-regions of training image 211 and small sub-region 201 may be provided to multi-stage fully convolutional network 105 as input image 111 to train multi-stage fully convolutional network 105 and/or other portions of semantic image segmentation system 100. In an embodiment, multi-stage fully convolutional network 105 may be pre-trained based on such small sub-regions without use of other components of semantic image segmentation system 100. In an embodiment, the entirety of semantic image segmentation system 100 may be trained based on such small sub-regions. As will be appreciated, the training set of training images including training image 211 may include hundreds, thousands, or more training images and such small sub-regions may also include hundreds, thousands, or more training sub-regions.

Furthermore, with continued reference to FIGS. 1 and 2, during the training phase, larger sub-regions such as large sub-region 202 of training images such as training image 211 may be provided, along with corresponding ground truth semantic and objectness information, during the global training of multi-stage fully convolutional network 105 and/or other portions of semantic image segmentation system 100. For example, training image 211 may be cropped randomly to generate large sub-region 202 and/or other large sub-region of training image 211 and large sub-region 202 may be provided to multi-stage fully convolutional network 105 as input image 111 to train multi-stage fully convolutional network 105 and/or other portions of semantic image segmentation system 100. In an embodiment, multi-stage fully convolutional network 105 may be pre-trained based on such large sub-regions without use of other components of semantic image segmentation system 100. In an embodiment, the entirety of semantic image segmentation system 100 may be trained based on such large sub-regions.

Returning now to FIG. 1 and discussion of fused semantic and objectness classification module 106, during an implementation or testing phase, semantic image segmentation system 100 receives input image 111 for semantic image segmentation. During implementation, input image 111 is received for processing without ground truth information and it is the purpose of semantic image segmentation system 100 to provide pixel level (e.g., pixel-by-pixel) output semantic labels 121 that correspond to input image 111. Output semantic labels 121 may include any suitable information, data structure, or the like that provide semantic image segmentation of input image 111. For example, output semantic labels 121 provide pixel level category labels for each pixel of input image 111 from available category labels (e.g., C classification options) optionally including a non-object classification.

In addition or in the alternative, output objectness labels 122 may be provided corresponding to input image 111. Output objectness labels 122 may include any suitable information, data structure, or the like that provide objectness image segmentation of input image 111. For example, output objectness labels 122 provide pixel level (e.g., pixel-by-pixel) object or non-object labels for each pixel of input image 111. Output objectness labels 122 may be characterized as a objectness binary map, objectness binary mask, or the like.

Output semantic labels 121 and/or output objectness labels 122 may be stored to memory, provided to another application, transmitted to another device, or the like. For example, such output semantic labels 121 and/or output objectness labels 122 may be used in a wide array of applications such as computer vision, gaming such as somatosensory gaming, object detection, object tracking, scene understanding, human-machine interaction, unmanned vehicles (e.g., drones or cars), and so on. With respect to FIGS. 2-4 it is the goal of semantic image segmentation system 100 to, assuming the implementation phase input image is image 211, to, as closely as possible, provide results matching ground truth semantic labels 311 and ground truth objectness labels 411.

During implementation, semantic image segmentation system 100 receives input image 111. Fully convolutional network stages 151-155 provide feature maps 112-116 as discussed herein. Two or more low resolution feature maps such as feature maps 114-116 are combined to generate hyper-feature 188, which is up-sampled to the higher resolution of feature maps 114 and combined with feature maps 114. Such up-sampling and combining with an earlier stage feature map may be repeated any number of times to generate final set of features 181. Similarly, two or more low resolution feature maps such as feature maps 114-116 are combined to generate hyper-feature 198, which is up-sampled to the higher resolution of feature maps 114 and combined with feature maps 114 and such up-sampling and combining with an earlier stage feature map may be repeated any number of times to generate final set of features 191.

Final sets of features 181, 191 are provided to fused semantic and objectness classification module 106, which, as discussed includes semantic labels classification module 161 and objectness labels classification module 166. During the implementation or test phase, loss function modules 164, 169 are removed and classification modules 163, 168 are provided. For example, convolutional layer 162, which may be characterized as a semantic label based convolutional layer, and/or additional layers are applied to final set of features 181 to provide semantic scores corresponding to input image 111. Similarly, convolutional layer 167, which may be characterized as an objectness label based convolutional layer, and/or additional layers are applied to final set of features 191 to provide objectness scores corresponding to input image 111.

Based on the resultant semantic and objectness scores, classification modules 163, 168 and adder 165 provide a fused or summed classification to generate output semantic labels 121 and/or output objectness labels 122. For example, the resultant semantic scores and objectness scores may be summed and the resultant summed scores may be used for semantic segmentation by classification module 163. Such classification may be performed using any suitable technique or techniques. In an embodiment, the summed scores may be compared to a threshold and only those scores comparing favorably to the threshold (e.g., exceeding the threshold or the like) are provided a semantic label. If a summed score does not compare favorably to the threshold, an output label of no object is provided. In an embodiment, a highest probability semantic label from the resultant semantic scores is provided for each pixel deemed to have an object corresponding thereto. In an embodiment, a number of highest probability labels are provided along with their corresponding probabilities. Furthermore, region merging techniques, filtering techniques, or the like may be applied to spatially smooth the semantic labels to generate output semantic labels 121.

Furthermore, classification module 168 may generate output objectness labels 122 based on the resultant objectness scores from convolutional layer 167 and/or the resultant semantic scores from convolutional layer 162. In an embodiment, output objectness labels 122 are based on the resultant objectness scores from convolutional layer 167 without use of the resultant semantic scores from convolutional layer 162. For example, output objectness labels 122 may provide the most probable result from the resultant objectness scores indicating whether each pixel of input image 111 is an object or not. In an embodiment, output objectness labels 122 are based on the summed scores of the resultant objectness scores and the resultant semantic scores as discussed. For example, output objectness labels 122 may provide the most probable result from the resultant summed scores indicating whether each pixel of input image 111 is an object or not.

Figure 5:
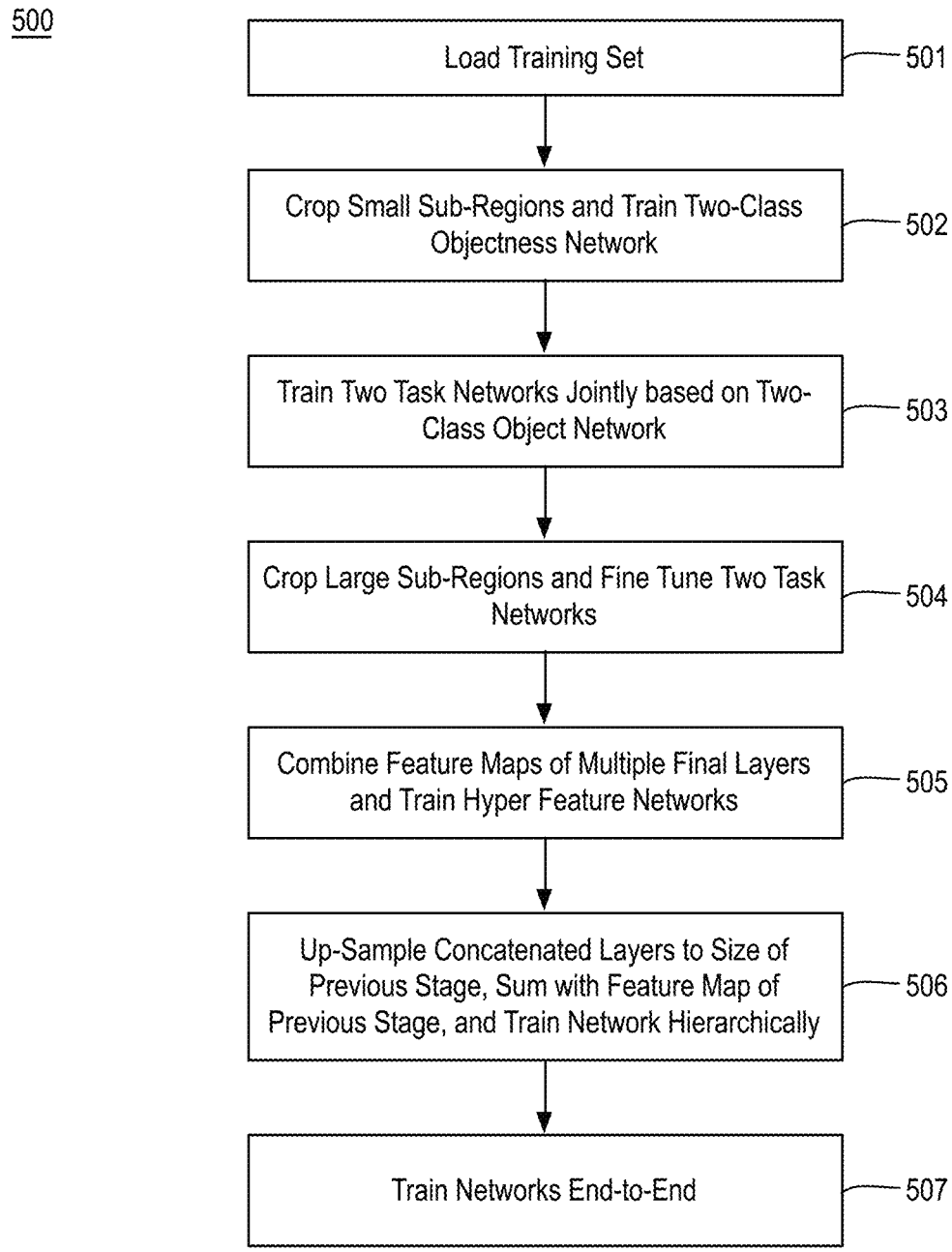
FIG. 5 is a flow diagram illustrating an example process for training semantic image segmentation system.

FIG. 5 is a flow diagram illustrating an example process 500 for training semantic image segmentation system 100, arranged in accordance with at least some implementations of the present disclosure. Process 500 may include one or more operations 501-507 as illustrated in FIG. 5. Process 500 may be performed by a device (e.g., system 100, any other devices or systems discussed herein, or an external training device such as a computer device or the like) to train a semantic image segmentation system for implementation as discussed herein. Process 500 or portions thereof may be repeated for any training image sets, semantic image segmentation system, or the like.

Process 500 may begin at operation 501, where a training set of images or image data may be loaded. Such training data may include any suitable training data such as known or generated images, ground truth semantic labels corresponding to such images, ground truth objectness labels corresponding to such images, or the like.

Processing may continue at operation 502, where small sub-regions may be cropped from the training images to train a two-class objectness network. The small sub-regions may be cropped from the training images using any suitable technique or techniques. In an embodiment, one or more small sub-regions are cropped from each training image randomly. In an embodiment, one or more small sub-regions are cropped from each training image randomly such that each small region has the same size. In an embodiment, small ($N_S \times N_S$) sub-regions are randomly cropped from the training images to train a two-class object network.

For example, semantic image segmentation system 100 may be trained by process 500 in a step-wise manner that builds on previous training. For example, at operation 502, a two-class object network is trained. With reference to FIG. 1, the two-class object network may include multi-stage fully convolutional network 105 (without use of semantic label hyper-feature network 108 and objectness label hyper-feature network 109) trained using a loss function provided by loss function module 169. For example, feature maps 116 or the like and suitable objectness classification may be used to initially train multi-stage fully convolutional network 105 using small sub-regions and two-class (e.g., objectness) classification only. For example, training of semantic image segmentation system 100 may begin on small sub-region images using a two-class object sub-network of semantic image segmentation system 100.

Processing may continue at operation 503, where a two task network may be jointly trained based on the trained two-class objectness network and the small sub-regions. The two task network may be jointly trained using any suitable technique or techniques. In an embodiment, the two task network includes the two-class objectness network trained at operation 502 and a fused C-class semantic segmentation network for C-class semantic segmentation. For example, the two task network may include the initially trained multi-stage fully convolutional network 105 (again without use of semantic label hyper-feature network 108 and objectness label hyper-feature network 109) trained using a fused loss function provided by loss function modules 164, 169 and adder 165 (e.g., a fused loss function such as the loss function provided by Equation (1)). For example, feature maps 116 or the like and suitable objectness classification and suitable semantic classification may be used to continue to train multi-stage fully convolutional network 105 using small sub-regions and two task (e.g., objectness and semantic) classification. For example, training of semantic image segmentation system 100 may continue with small subregion images using a fused two task network of semantic image segmentation system 100.

Processing may continue at operation 504, where large sub-regions may be cropped from the training images loaded at operation 501 to fine tune the two task object network trained at operation 503. The large sub-regions may be cropped from the training images using any suitable technique or techniques. In an embodiment, one or more large sub-regions are cropped from each training image randomly. In an embodiment, one or more large sub-regions are cropped from each training image randomly such that each large region has the same size. In an embodiment, one or more large sub-regions are cropped from each training image randomly such that the large sub-regions all have a larger size than the small sub-regions cropped at operation 502. In an embodiment, large ($N_L \times N_L$) sub-regions are randomly cropped from the training images to fine tune the two task (e.g., multi-task) networks including the objectness network and the semantic segmentation network.

For example, as discussed, the two task network may fine tuned at operation 504 may be the two class network discussed with respect operation 503. The fine tuning performed at operation 504 may provide additional contextual information with respect to the training provided at operation 502 and 503.

Processing may continue at operation 505, where feature maps of two or more final layers of the multi-stage fully convolutional network may be combined (e.g., concatenated) to train hyper-feature networks. For example, feature maps may be generated using small and/or large sub-regions and/or entire training images based on the multi-stage fully convolutional network fine tuned at operation 504. The feature maps (e.g., feature maps 114, 115, 116), at the same resolution or scale, are combined using any suitable technique or techniques such as concatenation techniques to generate hyper-features. The hyper-features are used to train semantic label hyper-feature network 108 and/or objectness label hyper-feature network 109. For example, the training of multi-stage fully convolutional network 105 may continue along with the training of semantic label hyper-feature network 108 and objectness label hyper-feature network 109.

Processing may continue at operation 506, where the hyper-feature may be up-sampled to the resolution or size of a previous stage of the multi-stage fully convolutional network, summed with the feature map or maps from the previous stage, such up-sampling and summing may be repeated any number of ties and the whole network of the semantic image segmentation system may be trained hierarchically. For example, hyper-feature 188 and hyper-feature 198 may be up-sampled and summed with feature maps 113 and the summation may be up-sampled and summed with feature maps 112. As discussed, such processing may be performed for any number of previous stages of multi-stage fully convolutional network 105. The networks of semantic image segmentation system 100 are then trained hierarchically based on the up-sampled and summed feature maps and final sets of features 181, 191.

Processing may continue at operation 507, where the discussed networks are trained in an end-to-end manner. For example, the networks of semantic image segmentation system 100 may be trained based on the training images (and/or sub-regions thereof) by providing them to semantic image segmentation system 100 all at once (e.g., all components or networks together) from the input to the output based on the fused loss functions as discussed herein.

Figure 6:
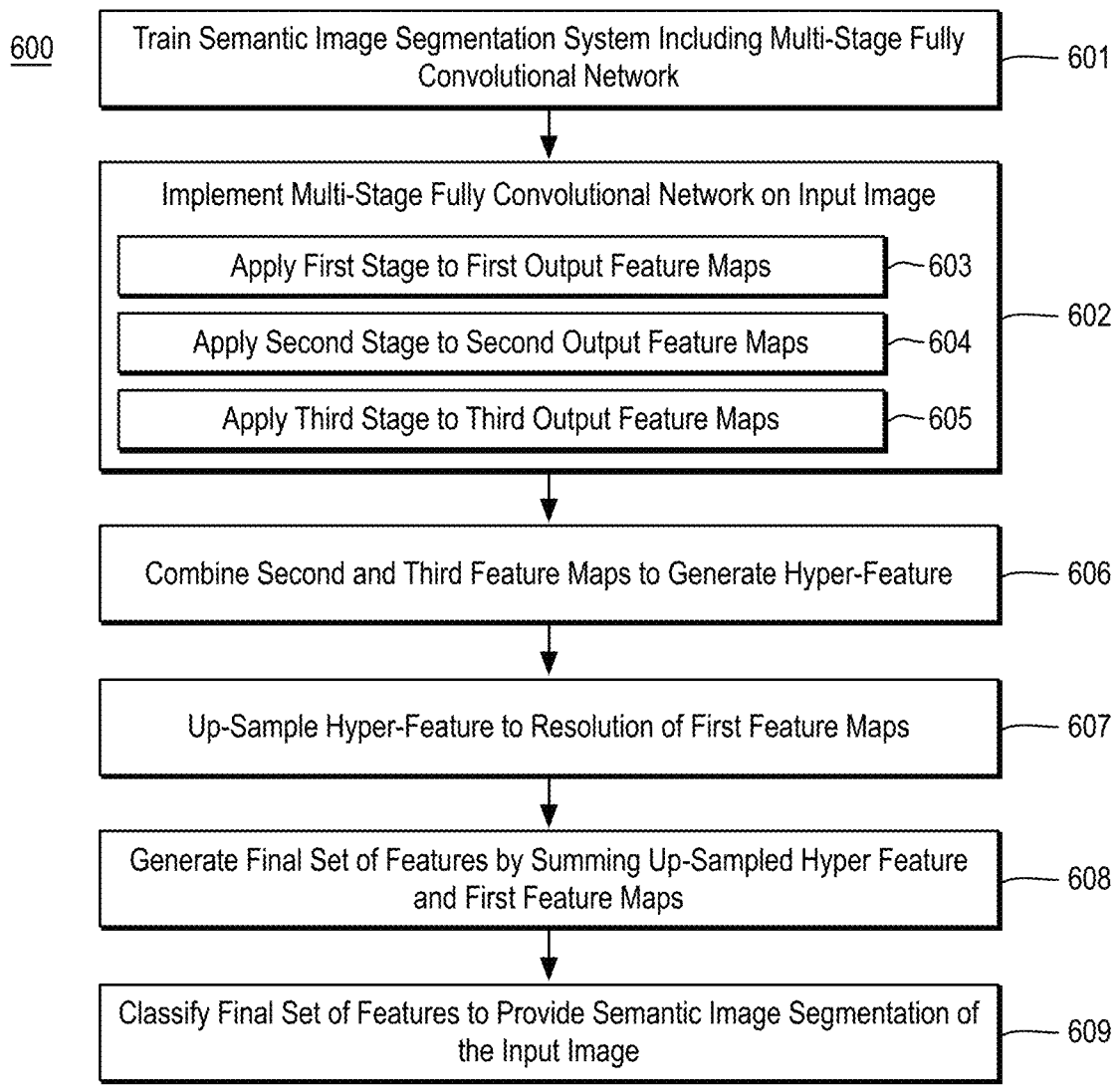
FIG. 6 is a flow diagram illustrating an example process for performing semantic image segmentation.

FIG. 6 is a flow diagram illustrating an example process 600 for performing semantic image segmentation, arranged in accordance with at least some implementations of the present disclosure. Process 600 may include one or more operations 601-609 as illustrated in FIG. 6. Process 600 may form at least part of a semantic image segmentation process. By way of non-limiting example, process 600 may form at least part of a semantic image segmentation process performed by system 100. Furthermore, process 600 will be described herein with reference to system 700 of FIG. 7.

Figure 7:
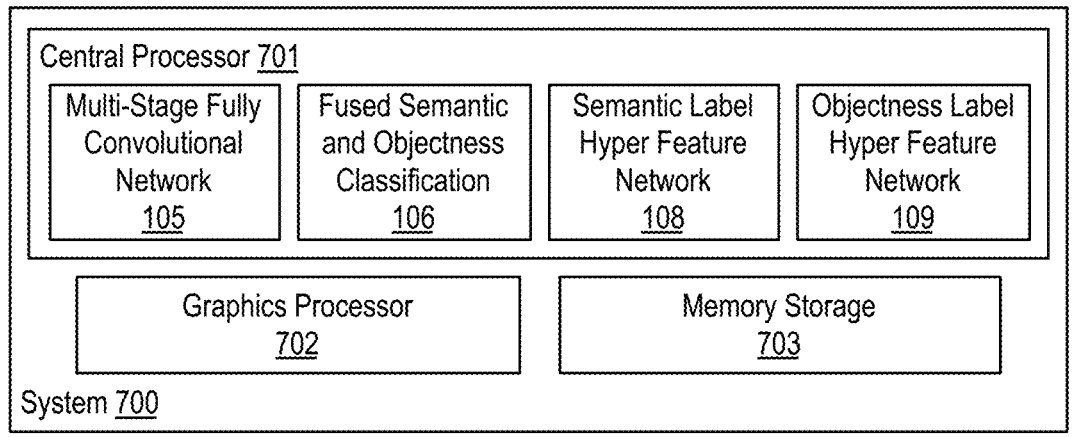
FIG. 7 is an illustrative diagram of an example system for performing semantic image segmentation.

FIG. 7 is an illustrative diagram of an example system 700 for performing semantic image segmentation, arranged in accordance with at least some implementations of the present disclosure. As shown in FIG. 7, system 700 may include a central processor 701, a graphics processor 702, and memory storage 703. Also as shown, central processor 701 may include or implement multi-stage fully convolutional network 105, fused semantic and objectness classification module 106, semantic label hyper-feature network 108, and objectness label hyper-feature network 109. Such modules may be implemented to perform operations as discussed herein. In the example of system 700, memory storage 703 may store input image data, training image data, image sub-regions, feature maps, hyper-features, output semantic labels, output objectness labels, training feedback, or any other information or data discussed herein.

As shown, in some examples, multi-stage fully convolutional network 105, fused semantic and objectness classification module 106, semantic label hyper-feature network 108, and objectness label hyper-feature network 109 may be implemented via central processor 701. In other examples, all, some, or portions of multi-stage fully convolutional network 105, fused semantic and objectness classification module 106, semantic label hyper-feature network 108, and objectness label hyper-feature network 109 may be implemented via graphics processor 702 or an image processing unit (not shown) of system 700. In yet other examples, all, some, or portions of multi-stage fully convolutional network 105, fused semantic and objectness classification module 106, semantic label hyper-feature network 108, and objectness label hyper-feature network 109 may be implemented via an imaging processing pipeline, graphics pipeline, or the like.

Graphics processor 702 may include any number and type of graphics processing units, that may provide the operations as discussed herein. Such operations may be implemented via software or hardware or a combination thereof. For example, graphics processor 702 may include circuitry dedicated to manipulate image data, semantic image segmentation system data, or the like obtained from memory storage 703. Central processor 701 may include any number and type of processing units or modules that may provide control and other high level functions for system 700 and/or provide any operations as discussed herein. Memory storage 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 703 may be implemented by cache memory. In an embodiment, all, some, or portions of multi-stage fully convolutional network 105, fused semantic and objectness classification module 106, semantic label hyper-feature network 108, and objectness label hyper-feature network 109 may be implemented via an execution unit (EU) of graphics processor 702. The EU may include, for example, programmable logic or circuitry such as a logic core or cores that may provide a wide array of programmable logic functions. In an embodiment, all, some, or portions of multi-stage fully convolutional network 105, fused semantic and objectness classification module 106, semantic label hyper-feature network 108, and objectness label hyper-feature network 109 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, all, some, or portions of multi-stage fully convolutional network 105, fused semantic and objectness classification module 106, semantic label hyper-feature network 108, and objectness label hyper-feature network 109 may be implemented via an application specific integrated circuit (ASIC). The ASIC may include an integrated circuitry customized to perform the operations discussed herein.

Returning to discussion of FIG. 6, process 600 may begin at operation 601, where a semantic image segmentation system including a multi-stage fully convolutional network may be trained. The semantic image segmentation system may be trained using any suitable technique or techniques. In an embodiment, central processor 701 may train multi-stage fully convolutional network 105, fused semantic and objectness classification module 106, semantic label hyper-feature network 108, and objectness label hyper-feature network 109. In an embodiment, the multi-stage fully convolutional network to be trained includes a first stage to output a first feature map at a first resolution, a second stage, subsequent to the first stage in the multi-stage fully convolutional network, to output a second feature map at a second resolution less than the first resolution, and a third stage, subsequent to the second stage in the multi-stage fully convolutional network, to output a third feature map at the second resolution. Furthermore, as discussed, training the multi-stage fully convolutional network may include training other components of a semantic image segmentation system such as semantic and objectness classification modules (e.g., including semantic and objectness convolutional layers, respectively), a semantic label hyper-feature network, and an objectness label hyper-feature network.

In an embodiment, the training may include generating a final set of training features for a training image, applying a semantic label based convolutional layer to the final set of training features to provide semantic scores, applying an objectness based convolutional layer to the final set of features to provide objectness scores, and applying a loss function based on both a comparison of the semantic scores to ground truth semantic scores for the training image and a comparison of the objectness scores to ground truth objectness scores for the training image. In an embodiment, applying the loss function comprises weighting a first loss function including the comparison of the semantic scores to the ground truth semantic scores with a first weight and weighting a second loss function including the comparison of the objectness scores to the ground truth objectness scores with a second weight different than the first weight.

As discussed, the training may include generating a final set of training features for a training image. In an embodiment, generating the final set of training features includes applying the first stage of the multi-stage fully convolutional network to output a first training feature map at a first resolution, applying the second stage of the multi-stage fully convolutional network to output a second training feature map at a second resolution less than the first resolution, applying the third stage of the multi-stage fully convolutional network to output a third training feature map at the second resolution, combining at least the second and third training feature maps to generate a training hyper-feature corresponding to the training image, up-sampling the training hyper-feature to the first resolution, and generating the final set of training features by at least summing the up-sampled training hyper-feature and the first training feature map. For example, the final set of training features may be generated as discussed with respect to operations 602-608 below.

In addition or in the alternative, the training may include cropping one or more training images of the set of training images to generate first sub-regions, training, using the sub-regions, an objectness network comprising the multi-stage fully convolutional network and an objectness based convolutional layer, refining the training, using the sub-regions, of the objectness network and training, using the sub-regions, a semantic label network comprising the multi-stage fully convolutional network and a semantic label based convolutional layer, cropping the one or more training images of the set of training images to generate second sub-regions, wherein all the second sub-regions are larger than all the first sub-regions, training a hyper-feature network, and end-to-end training a system including the objectness network, the semantic label network, and the hyper-feature network to generate a final semantic image segmentation system. For example, training the hyper-feature network may be performed by concatenating feature maps, generated based on the second sub-regions, from the second stage, the third stage, and a fourth stage subsequent to the third stage to generate training hyper-features, up-sampling the training hyper-features to the first resolution, generating final sets of training features corresponding to the second sub-regions by at least summing the up-sampled training hyper-feature and a first set of training feature maps, and hierarchically training the hyper-feature network based on the final sets of training features.

Processing may continue at operation 602, where a multi-stage fully convolutional network is implemented based on an input image. For example, a multi-stage fully convolutional network as trained at operation 601 may be implemented at operation 602. As shown, implementing the multi-stage fully convolutional network may include at least sub-operations 603-605. For example, operation 602 may include sub-operation 603, where a first stage of the multi-stage fully convolutional network may be applied to output a first feature map at a first resolution, sub-operation 604, where a second stage of the multi-stage fully convolutional network, subsequent to the first stage in the multi-stage fully convolutional network, may be applied to output a second feature map at a second resolution less than the first resolution, and sub-operation 605, where a third stage of the multi-stage fully convolutional network, subsequent to the second stage in the multi-stage fully convolutional network, may be applied to output a third feature map at the second resolution. The first, second, and third stages may each include any number of convolutional layers, max pooling layers, or the like. In an embodiment, the first stage includes two convolutional layers and a max pooling layer and the second stage includes three convolutional layers and a max pooling layer.

Processing may continue at operation 606, where at least the second and third feature maps are combined to generate a hyper-feature corresponding to the input image. The second and third feature maps may be combined using any suitable technique or techniques. In an embodiment, the second and third feature maps are combined by concatenating the second and third feature maps. In an embodiment, the second and third feature maps are output from middle stages of shared two task networks (e.g., an objectness network and a semantic segmentation network). As discussed below, in some embodiments the second and third feature maps are further combined with another feature map at the same resolution of the second and third feature maps to generate the hyper-feature. In an embodiment, the hyper-feature may be generated for use in a semantic segmentation network as discussed herein. In an embodiment, the hyper-feature is also be used in an object segmentation network. In an embodiment, a second hyper-feature may be generated for use in the object segmentation network.

Processing may continue at operation 607, where the hyper-feature is up-sampled to the first resolution. The hyper-feature may be up-sampled using any suitable technique or techniques. Processing may continue at operation 608, where a final set of features corresponding to the input image may be generated by at least summing the up-sampled hyper-feature and the first feature map. For example, the up-sampled hyper-feature and the first feature map may be summed to generate a final set of features for a in a semantic segmentation network as discussed herein. In an embodiment, the final set of features are also be used in an object segmentation network. In an embodiment, a second final set of features may be generated for use in the object segmentation network.

As discussed, two feature maps may be concatenated, up-sampled, and summed with an earlier stage feature map to generate a final set of features. In an embodiment, implementing the multi-stage fully convolutional network for the input image further includes applying a fourth stage, prior to the first stage, to output a fourth feature map at a third resolution greater than the first resolution and applying a fifth stage, subsequent to the third stage in the multi-stage fully convolutional network, to output a fifth feature map at the second resolution. Furthermore, combining at least the second and third feature maps to generate the hyper-feature may include combining the second, third, and fifth feature maps to generate the hyper-feature and generating the final set of features may include up-sampling the sum of the up-sampled hyper-feature and the first feature map to the third resolution and summing the up-sampled features and the fourth feature maps.

Processing may continue at operation 609, where the final set of features are classified to provide a semantic image segmentation of the input image such that the semantic image segmentation includes pixel-level category labels for pixels of the input image. The classification may be performed using any suitable technique or techniques. In an embodiment, classifying the final set of features includes applying a semantic label based convolutional layer to the final set of features to provide semantic scores, applying an objectness based convolutional layer to the final set of features (or a second set of final features) to provide objectness scores, and classifying the semantic scores and the objectness scores to provide the semantic image segmentation. In an embodiment, classifying the semantic scores and objectness scores includes summing the semantic scores and objectness scores and classifying the summed scores.

As discussed, process 600 may provide a semantic image segmentation of an input image. In an embodiment, an objectness image segmentation of the input image may also be provided. In an embodiment, the semantic scores and the objectness scores are classified to provide an objectness image segmentation of the input image such that the objectness image segmentation including pixel-level object or non-object labels for pixels of the input image. The semantic image segmentation and/or the objectness image segmentation may be stored in memory storage, transmitted to another device, or used by another component of system 700. In an embodiment, process 600 further includes performing, based on the semantic image segmentation and/or the objectness image segmentation, at least one of object detection, object tracking, or scene understanding.

Process 600 may provide for generating semantic image segmentation and/or objectness image segmentation based on input image data such as an image frame, a picture or frame of a video sequence, or the like. Process 600 may be repeated any number of times either in series or in parallel for any number of input images, input frames, or the like. As discussed process 600 may provide for high quality semantic image segmentation and/or objectness image segmentation and in implementation (e.g., as implemented with respect to system 700) may provide for reduced memory and computational requirements.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the systems or devices discussed herein, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
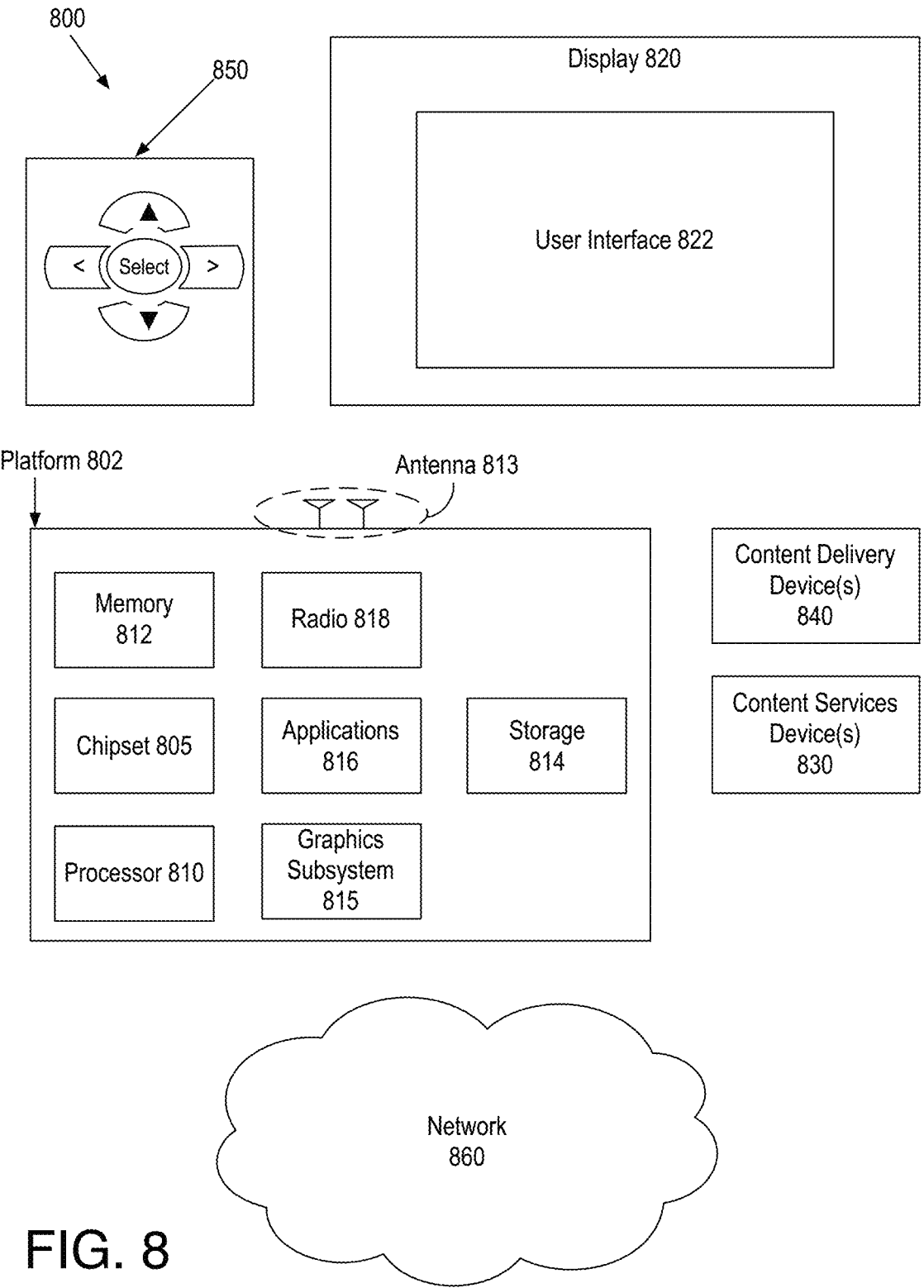
FIG. 8 is an illustrative diagram of an example system.

FIG. 8 is an illustrative diagram of an example system 800, arranged in accordance with at least some implementations of the present disclosure. In various implementations, system 800 may be a computing system although system 800 is not limited to this context. For example, system 800 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 800 includes a platform 802 coupled to a display 820. Platform 802 may receive content from a content device such as content services device(s) 830 or content delivery device(s) 840 or other similar content sources such as a camera or camera module or the like. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still images, graphics, or video for display. Graphics subsystem 815 may be a graphics processing unit (GPU), a visual processing unit (VPU), or an image processing unit, for example. In some examples, graphics subsystem 815 may perform scanned image rendering as discussed herein. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The image or video processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any flat panel monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of navigation controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, navigation controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
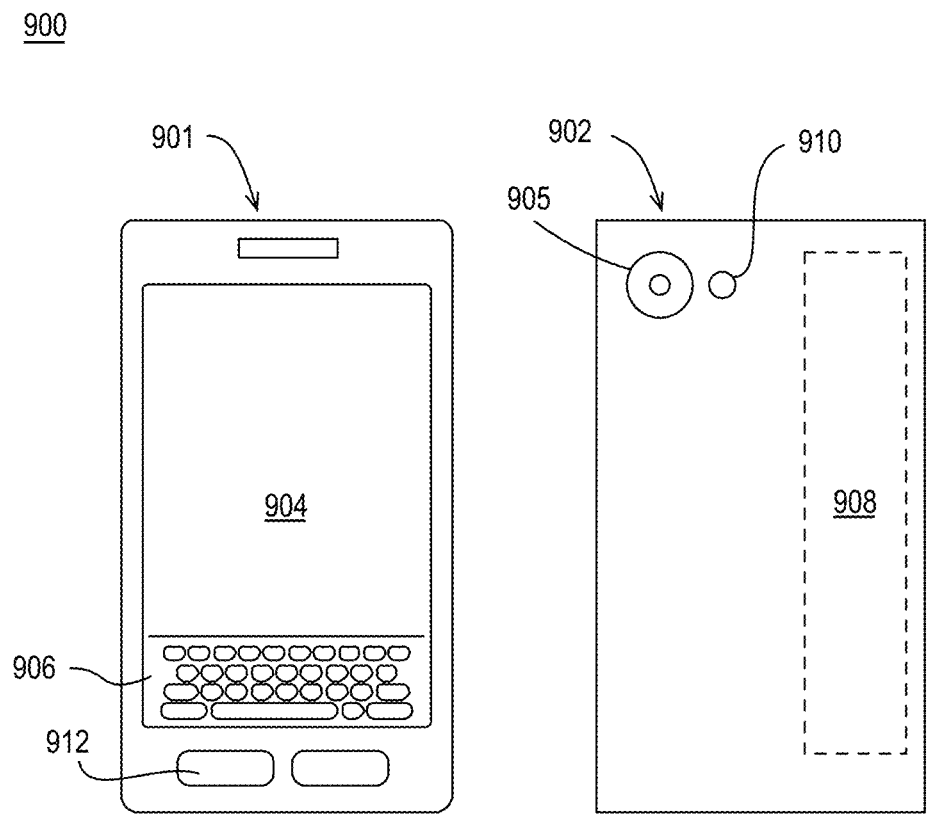
FIG. 9 illustrates an example device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 800 may be implemented via device 900. In other examples, system 100 or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include a camera 905 (e.g., including a lens, an aperture, and an imaging sensor) and a flash 910 integrated into back 902 (or elsewhere) of device 900. In other examples, camera 905 and flash 910 may be integrated into front 901 of device 900 or both front and back cameras may be provided. Camera 905 and flash 910 may be components of a camera module to originate image data processed into streaming video that is output to display 904 and/or communicated remotely from device 900 via antenna 908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for performing semantic image segmentation comprises implementing a multi-stage fully convolutional network based on an input image, wherein implementing the multi-stage fully convolutional network comprises applying a first stage to output a first feature map at a first resolution, applying a second stage, subsequent to the first stage in the multi-stage fully convolutional network, to output a second feature map at a second resolution less than the first resolution, and applying a third stage, subsequent to the second stage in the multi-stage fully convolutional network, to output a third feature map at the second resolution, combining at least the second and third feature maps to generate a hyper-feature corresponding to the input image, up-sampling the hyper-feature to the first resolution, generating a final set of features corresponding to the input image by at least summing the up-sampled hyper-feature and the first feature map, and classifying the final set of features to provide a semantic image segmentation of the input image, the semantic image segmentation including pixel-level category labels for pixels of the input image.

Further to the first embodiments, implementing the multi-stage fully convolutional network based on the input image further comprises applying a fourth stage, prior to the first stage, to output a fourth feature map at a third resolution greater than the first resolution and applying a fifth stage, subsequent to the third stage in the multi-stage fully convolutional network, to output a fifth feature map at the second resolution, wherein combining at least the second and third feature maps to generate the hyper-feature comprises combining the second, third, and fifth feature maps to generate the hyper-feature, and wherein generating the final set of features further comprises up-sampling the sum of the up-sampled hyper-feature and the first feature map to the third resolution and summing the up-sampled features and the fourth feature maps.

Further to the first embodiments, classifying the final set of features comprises applying a semantic label based convolutional layer to the final set of features to provide semantic scores, applying an objectness based convolutional layer to the final set of features to provide objectness scores, and classifying the semantic scores and the objectness scores to provide the semantic image segmentation.

Further to the first embodiments, classifying the final set of features comprises applying a semantic label based convolutional layer to the final set of features to provide semantic scores, applying an objectness based convolutional layer to the final set of features to provide objectness scores, and classifying the semantic scores and the objectness scores to provide the semantic image segmentation, wherein classifying the semantic scores and objectness scores comprises summing the semantic scores and objectness scores and classifying the summed scores.

Further to the first embodiments, classifying the final set of features comprises applying a semantic label based convolutional layer to the final set of features to provide semantic scores, applying an objectness based convolutional layer to the final set of features to provide objectness scores, classifying the semantic scores and the objectness scores to provide the semantic image segmentation, and classifying the semantic scores and the objectness scores to provide an objectness image segmentation of the input image, the objectness image segmentation including pixel-level object or non-object labels for pixels of the input image.

Further to the first embodiments, classifying the final set of features comprises applying a semantic label based convolutional layer to the final set of features to provide semantic scores, applying an objectness based convolutional layer to the final set of features to provide objectness scores, and classifying the semantic scores and the objectness scores to provide the semantic image segmentation, wherein classifying the semantic scores and objectness scores comprises summing the semantic scores and objectness scores and classifying the summed scores.

Further to the first embodiments, the method further comprises training the multi-stage fully convolutional network based on a training image by generating a final set of training features for the training image, applying a semantic label based convolutional layer to the final set of training features to provide semantic scores, applying an objectness based convolutional layer to the final set of features to provide objectness scores, and applying a loss function based on both a comparison of the semantic scores to ground truth semantic scores for the training image and a comparison of the objectness scores to ground truth objectness scores for the training image.

Further to the first embodiments, the method further comprises training the multi-stage fully convolutional network based on a training image by generating a final set of training features for the training image, applying a semantic label based convolutional layer to the final set of training features to provide semantic scores, applying an objectness based convolutional layer to the final set of features to provide objectness scores, and applying a loss function based on both a comparison of the semantic scores to ground truth semantic scores for the training image and a comparison of the objectness scores to ground truth objectness scores for the training image, wherein generating the final set of training features comprises applying the first stage to output a first training feature map at the first resolution, applying the second stage to output a second training feature map at the second resolution, applying the third stage to output a third training feature map at the second resolution, combining at least the second and third training feature maps to generate a training hyper-feature corresponding to the training image, up-sampling the training hyper-feature to the first resolution, and generating the final set of training features by at least summing the up-sampled training hyper-feature and the first training feature map.

Further to the first embodiments, the method further comprises training the multi-stage fully convolutional network based on a training image by generating a final set of training features for the training image, applying a semantic label based convolutional layer to the final set of training features to provide semantic scores, applying an objectness based convolutional layer to the final set of features to provide objectness scores, and applying a loss function based on both a comparison of the semantic scores to ground truth semantic scores for the training image and a comparison of the objectness scores to ground truth objectness scores for the training image, wherein applying the loss function comprises weighting a first loss function comprising the comparison of the semantic scores to the ground truth semantic scores with a first weight and weighting a second loss function comprising the comparison of the objectness scores to the ground truth objectness scores with a second weight different than the first weight.

Further to the first embodiments, the method further comprises training the multi-stage fully convolutional network based on a training image by generating a final set of training features for the training image, applying a semantic label based convolutional layer to the final set of training features to provide semantic scores, applying an objectness based convolutional layer to the final set of features to provide objectness scores, and applying a loss function based on both a comparison of the semantic scores to ground truth semantic scores for the training image and a comparison of the objectness scores to ground truth objectness scores for the training image, wherein generating the final set of training features comprises applying the first stage to output a first training feature map at the first resolution, applying the second stage to output a second training feature map at the second resolution, applying the third stage to output a third training feature map at the second resolution, combining at least the second and third training feature maps to generate a training hyper-feature corresponding to the training image, up-sampling the training hyper-feature to the first resolution, and generating the final set of training features by at least summing the up-sampled training hyper-feature and the first training feature map, and/or wherein applying the loss function comprises weighting a first loss function comprising the comparison of the semantic scores to the ground truth semantic scores with a first weight and weighting a second loss function comprising the comparison of the objectness scores to the ground truth objectness scores with a second weight different than the first weight.

Further to the first embodiments, the method further comprises training the multi-stage fully convolutional network based on a set of training images by cropping one or more training images of the set of training images to generate first sub-regions, training, using the sub-regions, an objectness network comprising the multi-stage fully convolutional network and an objectness based convolutional layer, refining the training, using the sub-regions, of the objectness network and training, using the sub-regions, a semantic label network comprising the multi-stage fully convolutional network and a semantic label based convolutional layer, cropping the one or more training images of the set of training images to generate second sub-regions, wherein all the second sub-regions are larger than all the first sub-regions, training a hyper-feature network by concatenating feature maps, generated based on the second sub-regions, from the second stage, the third stage, and a fourth stage subsequent to the third stage to generate training hyper-features, up-sampling the training hyper-features to the first resolution, generating final sets of training features corresponding to the second sub-regions by at least summing the up-sampled training hyper-feature and a first set of training feature maps, and hierarchically training the hyper-feature network based on the final sets of training features, and end-to-end training a system including the objectness network, the semantic label network, and the hyper-feature network to generate a final semantic image segmentation system.

Further to the first embodiments, the first stage comprises two convolutional layers and a max pooling layer and the second stage comprises three convolutional layers and a max pooling layer.

Further to the first embodiments, the method further comprises performing, based on the semantic image segmentation, at least one of object detection, object tracking, or scene understanding.

In one or more second embodiments, a system for performing semantic image segmentation comprises a memory storage configured to receive an input image and a processor coupled to the memory storage, the processor to implement a multi-stage fully convolutional network based on an input image, wherein to implement the multi-stage fully convolutional network, the processor is to apply a first stage to output a first feature map at a first resolution, to apply a second stage, subsequent to the first stage in the multi-stage fully convolutional network, to output a second feature map at a second resolution less than the first resolution, and to apply a third stage, subsequent to the second stage in the multi-stage fully convolutional network, to output a third feature map at the second resolution, combine at least the second and third feature maps to generate a hyper-feature corresponding to the input image, up-sample the hyper-feature to the first resolution, generate a final set of features corresponding to the input image by at least summing the up-sampled hyper-feature and the first feature map, and classify the final set of features to provide a semantic image segmentation of the input image, the semantic image segmentation including pixel-level category labels for pixels of the input image.

Further to the second embodiments, the processor to implement the multi-stage fully convolutional network based on the input image further comprises the processor to apply a fourth stage, prior to the first stage, to output a fourth feature map at a third resolution greater than the first resolution and to apply a fifth stage, subsequent to the third stage in the multi-stage fully convolutional network, to output a fifth feature map at the second resolution, wherein the processor to combine at least the second and third feature maps to generate the hyper-feature comprises the processor to combine the second, third, and fifth feature maps to generate the hyper-feature, and wherein the processor to generate the final set of features further comprises the processor to up-sample the sum of the up-sampled hyper-feature and the first feature map to the third resolution and sum the up-sampled features and the fourth feature maps.

Further to the second embodiments, the processor to classify the final set of features comprises the processor to apply a semantic label based convolutional layer to the final set of features to provide semantic scores, apply an objectness based convolutional layer to the final set of features to provide objectness scores, and to classify the semantic scores and the objectness scores to provide the semantic image segmentation.

Further to the second embodiments, the processor to classify the final set of features comprises the processor to apply a semantic label based convolutional layer to the final set of features to provide semantic scores, apply an objectness based convolutional layer to the final set of features to provide objectness scores, and to classify the semantic scores and the objectness scores to provide the semantic image segmentation, wherein the processor to classify the semantic scores and objectness scores comprises the processor to sum the semantic scores and objectness scores and classify the summed scores.

Further to the second embodiments, the processor to classify the final set of features comprises the processor to apply a semantic label based convolutional layer to the final set of features to provide semantic scores, apply an objectness based convolutional layer to the final set of features to provide objectness scores, and to classify the semantic scores and the objectness scores to provide the semantic image segmentation, wherein the processor is further to classify the semantic scores and the objectness scores to provide an objectness image segmentation of the input image, the objectness image segmentation including pixel-level object or non-object labels for pixels of the input image.

Further to the second embodiments, the processor is further to train the multi-stage fully convolutional network based on a training image, wherein to train the multi-stage fully convolutional network the processor is to generate a final set of training features for the training image, to apply a semantic label based convolutional layer to the final set of training features to provide semantic scores, to apply an objectness based convolutional layer to the final set of features to provide objectness scores, and to apply a loss function based on both a comparison of the semantic scores to ground truth semantic scores for the training image and a comparison of the objectness scores to ground truth objectness scores for the training image.

Further to the second embodiments, the processor is further to train the multi-stage fully convolutional network based on a training image, wherein to train the multi-stage fully convolutional network the processor is to generate a final set of training features for the training image, to apply a semantic label based convolutional layer to the final set of training features to provide semantic scores, to apply an objectness based convolutional layer to the final set of features to provide objectness scores, and to apply a loss function based on both a comparison of the semantic scores to ground truth semantic scores for the training image and a comparison of the objectness scores to ground truth objectness scores for the training image, wherein to generate the final set of training features comprises the processor to apply the first stage to output a first training feature map at the first resolution, to apply the second stage to output a second training feature map at the second resolution, to apply the third stage to output a third training feature map at the second resolution, to combine at least the second and third training feature maps to generate a training hyper-feature corresponding to the training image, to up-sample the training hyper-feature to the first resolution, and to generate the final set of training features based on at least a sum of the up-sampled training hyper-feature and the first training feature map.

Further to the second embodiments, the processor is further to train the multi-stage fully convolutional network based on a training image, wherein to train the multi-stage fully convolutional network the processor is to generate a final set of training features for the training image, to apply a semantic label based convolutional layer to the final set of training features to provide semantic scores, to apply an objectness based convolutional layer to the final set of features to provide objectness scores, and to apply a loss function based on both a comparison of the semantic scores to ground truth semantic scores for the training image and a comparison of the objectness scores to ground truth objectness scores for the training image, wherein to apply the loss function comprises the processor to weight a first loss function comprising the comparison of the semantic scores to the ground truth semantic scores with a first weight and to weight a second loss function comprising the comparison of the objectness scores to the ground truth objectness scores with a second weight different than the first weight.

Further to the second embodiments, the processor is further to train the multi-stage fully convolutional network based on a set of training images, wherein to train the multi-stage fully convolutional network the processor is to crop one or more training images of the set of training images to generate first sub-regions, to train, using the sub-regions, an objectness network comprising the multi-stage fully convolutional network and an objectness based convolutional layer, to refine the training, using the sub-regions, of the objectness network and to train, using the sub-regions, a semantic label network comprising the multi-stage fully convolutional network and a semantic label based convolutional layer, to crop the one or more training images of the set of training images to generate second sub-regions, wherein all the second sub-regions are larger than all the first sub-regions, to train a hyper-feature network, wherein to train the hyper-feature network, the processor is to concatenate feature maps, generated based on the second sub-regions, from the second stage, the third stage, and a fourth stage subsequent to the third stage to generate training hyper-features, to up-sample the training hyper-features to the first resolution, to generate final sets of training features corresponding to the second sub-regions based on at least a sum of the up-sampled training hyper-feature and a first set of training feature maps, and to hierarchically train the hyper-feature network based on the final sets of training features, and to end-to-end train a system including the objectness network, the semantic label network, and the hyper-feature network to generate a final semantic image segmentation system.

Further to the second embodiments, the first stage comprises two convolutional layers and a max pooling layer and the second stage comprises three convolutional layers and a max pooling layer.

Further to the second embodiments, the processor is further to perform, based on the semantic image segmentation, at least one of object detection, object tracking, or scene understanding.

In one or more third embodiments, a system for performing semantic image segmentation comprises means for implementing a multi-stage fully convolutional network based on an input image, wherein the means for implementing the multi-stage fully convolutional network comprise means for applying a first stage to output a first feature map at a first resolution, means for applying a second stage, subsequent to the first stage in the multi-stage fully convolutional network, to output a second feature map at a second resolution less than the first resolution, and means for applying a third stage, subsequent to the second stage in the multi-stage fully convolutional network, to output a third feature map at the second resolution, means for combining at least the second and third feature maps to generate a hyper-feature corresponding to the input image, means for up-sampling the hyper-feature to the first resolution, means for generating a final set of features corresponding to the input image by at least summing the up-sampled hyper-feature and the first feature map, and means for classifying the final set of features to provide a semantic image segmentation of the input image, the semantic image segmentation including pixel-level category labels for pixels of the input image.

Further to the third embodiments, the means for implementing the multi-stage fully convolutional network based on the input image further comprises means for applying a fourth stage, prior to the first stage, to output a fourth feature map at a third resolution greater than the first resolution and means for applying a fifth stage, subsequent to the third stage in the multi-stage fully convolutional network, to output a fifth feature map at the second resolution, wherein the means for combining at least the second and third feature maps to generate the hyper-feature comprise means for combining the second, third, and fifth feature maps to generate the hyper-feature, and wherein the means for generating the final set of features further comprise means for up-sampling the sum of the up-sampled hyper-feature and the first feature map to the third resolution and means for summing the up-sampled features and the fourth feature maps.

Further to the third embodiments, the means for classifying the final set of features comprises means for applying a semantic label based convolutional layer to the final set of features to provide semantic scores, means for applying an objectness based convolutional layer to the final set of features to provide objectness scores, and means for classifying the semantic scores and the objectness scores to provide the semantic image segmentation.

Further to the third embodiments, the means for classifying the final set of features comprises means for applying a semantic label based convolutional layer to the final set of features to provide semantic scores, means for applying an objectness based convolutional layer to the final set of features to provide objectness scores, and means for classifying the semantic scores and the objectness scores to provide the semantic image segmentation, wherein the means for classifying the semantic scores and objectness scores comprises means for summing the semantic scores and objectness scores and means for classifying the summed scores.

Further to the third embodiments, the means for classifying the final set of features comprises means for applying a semantic label based convolutional layer to the final set of features to provide semantic scores, means for applying an objectness based convolutional layer to the final set of features to provide objectness scores, means for classifying the semantic scores and the objectness scores to provide the semantic image segmentation, and means for classifying the semantic scores and the objectness scores to provide an objectness image segmentation of the input image, the objectness image segmentation including pixel-level object or non-object labels for pixels of the input image.

Further to the third embodiments, the system further comprises means for performing, based on the semantic image segmentation, at least one of object detection, object tracking, or scene understanding.

In one or more fourth embodiments, at least one machine readable medium comprises a plurality of instructions that, in response to being executed on a computing device, cause the computing device to perform semantic image segmentation by implementing a multi-stage fully convolutional network based on an input image, wherein implementing the multi-stage fully convolutional network comprises applying a first stage to output a first feature map at a first resolution, applying a second stage, subsequent to the first stage in the multi-stage fully convolutional network, to output a second feature map at a second resolution less than the first resolution, and applying a third stage, subsequent to the second stage in the multi-stage fully convolutional network, to output a third feature map at the second resolution, combining at least the second and third feature maps to generate a hyper-feature corresponding to the input image, up-sampling the hyper-feature to the first resolution, generating a final set of features corresponding to the input image by at least summing the up-sampled hyper-feature and the first feature map, and classifying the final set of features to provide a semantic image segmentation of the input image, the semantic image segmentation including pixel-level category labels for pixels of the input image.

Further to the fourth embodiments, implementing the multi-stage fully convolutional network based on the input image further comprises applying a fourth stage, prior to the first stage, to output a fourth feature map at a third resolution greater than the first resolution and applying a fifth stage, subsequent to the third stage in the multi-stage fully convolutional network, to output a fifth feature map at the second resolution, wherein combining at least the second and third feature maps to generate the hyper-feature comprises combining the second, third, and fifth feature maps to generate the hyper-feature, and wherein generating the final set of features further comprises up-sampling the sum of the up-sampled hyper-feature and the first feature map to the third resolution and summing the up-sampled features and the fourth feature maps.

Further to the fourth embodiments, classifying the final set of features comprises applying a semantic label based convolutional layer to the final set of features to provide semantic scores, applying an objectness based convolutional layer to the final set of features to provide objectness scores, and classifying the semantic scores and the objectness scores to provide the semantic image segmentation.

Further to the fourth embodiments, classifying the final set of features comprises applying a semantic label based convolutional layer to the final set of features to provide semantic scores, applying an objectness based convolutional layer to the final set of features to provide objectness scores, and classifying the semantic scores and the objectness scores to provide the semantic image segmentation, wherein classifying the semantic scores and objectness scores comprises summing the semantic scores and objectness scores and classifying the summed scores.

Further to the fourth embodiments, classifying the final set of features comprises applying a semantic label based convolutional layer to the final set of features to provide semantic scores, applying an objectness based convolutional layer to the final set of features to provide objectness scores, classifying the semantic scores and the objectness scores to provide the semantic image segmentation, and classifying the semantic scores and the objectness scores to provide an objectness image segmentation of the input image, the objectness image segmentation including pixel-level object or non-object labels for pixels of the input image.

Further to the fourth embodiments, the machine readable medium further comprises a plurality of instructions that, in response to being executed on the computing device, cause the computing device to perform, based on the semantic image segmentation, at least one of object detection, object tracking, or scene understanding.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store at least a portion of an input image; and
processor circuitry coupled to the memory, the processor circuitry to:
implement a multi-stage convolutional network based on the input image via application of first, second, and third stages to output a first feature map at a first resolution, a second feature map at a second resolution less than the first resolution, and a third feature map at the second resolution, respectively;
combine at least the second and third feature maps to generate a hyper-feature corresponding to the input image;
up-sample the hyper-feature to the first resolution;
generate a final set of features via combination of the up-sampled hyper-feature and the first feature map; and
provide a semantic image segmentation of the input image based on the final set of features.

2. The system of claim 1, wherein the processor circuitry to implement the multi-stage fully convolutional network based on the input image further comprises the processor circuitry to:
apply a fourth stage, prior to the first stage, to output a fourth feature map at a third resolution greater than the first resolution and a fifth stage, subsequent to the third stage in the multi-stage fully convolutional network, to output a fifth feature map at the second resolution,
wherein the processor circuitry to combine at least the second and third feature maps to generate the hyper-feature comprises the processor circuitry to combine the second, third, and fifth feature maps to generate the hyper-feature, and
wherein the processor circuitry to generate the final set of features comprises the processor circuitry to up-sample a sum of the up-sampled hyper-feature and the first feature map to the third resolution and to sum the up-sampled features and the fourth feature map.

3. The system of claim 1, wherein the processor circuitry to provide the semantic image segmentation comprises the processor circuitry to:
apply a semantic label based convolutional layer to the final set of features to provide semantic scores;
apply an objectness based convolutional layer to the final set of features to provide objectness scores; and
classify the semantic scores and the objectness scores to provide the semantic image segmentation.

4. The system of claim 3, wherein the processor circuitry to classify the semantic scores and objectness scores comprises the processor circuitry to sum the semantic scores and objectness scores and to classify the summed scores.

5. The system of claim 3, the processor circuitry to:
classify the semantic scores and the objectness scores to provide an objectness image segmentation of the input image, the objectness image segmentation including pixel-level object or non-object labels for pixels of the input image.

6. The system of claim 1, wherein the first stage comprises two convolutional layers and a max pooling layer and the second stage comprises three convolutional layers and a max pooling layer.

7. The system of claim 1, the processor circuitry to perform, based on the semantic image segmentation, at least one of object detection, object tracking, or scene understanding.

8. A method comprising:
implementing a multi-stage convolutional network based on an input image by applying first, second, and third stages to output a first feature map at a first resolution, a second feature map at a second resolution less than the first resolution, and a third feature map at the second resolution, respectively;
combining at least the second and third feature maps to generate a hyper-feature corresponding to the input image;
up-sampling the hyper-feature to the first resolution;
generating a final set of features by combining the up-sampled hyper-feature and the first feature map; and
providing a semantic image segmentation of the input image based on the final set of features.

9. The method of claim 8, wherein implementing the multi-stage fully convolutional network based on the input image further comprises:

applying a fourth stage, prior to the first stage, to output a fourth feature map at a third resolution greater than the first resolution and a fifth stage, subsequent to the third stage in the multi-stage fully convolutional network, to output a fifth feature map at the second resolution,
 wherein combining at least the second and third feature maps to generate the hyper-feature comprises combining the second, third, and fifth feature maps to generate the hyper-feature, and
 wherein generating the final set of features comprises up-sampling a sum of the up-sampled hyper-feature and the first feature map to the third resolution and summing the up-sampled features and the fourth feature map.

10. The method of claim 8, wherein providing the semantic image segmentation comprises:
 applying a semantic label based convolutional layer to the final set of features to provide semantic scores;
 applying an objectness based convolutional layer to the final set of features to provide objectness scores; and
 classifying the semantic scores and the objectness scores to provide the semantic image segmentation.

11. The method of claim 10, wherein classifying the semantic scores and objectness scores comprises summing the semantic scores and objectness scores and classifying the summed scores.

12. The method of claim 10, further comprising:
 classifying the semantic scores and the objectness scores to provide an objectness image segmentation of the input image, the objectness image segmentation including pixel-level object or non-object labels for pixels of the input image.

13. The method of claim 8, wherein the first stage comprises two convolutional layers and a max pooling layer and the second stage comprises three convolutional layers and a max pooling layer.

14. The method of claim 8, further comprising performing, based on the semantic image segmentation, at least one of object detection, object tracking, or scene understanding.

15. At least one non-transitory machine readable medium comprising a plurality of instructions that, in response to being executed on a computing device, cause the computing device to perform semantic image segmentation by:
 implementing a multi-stage convolutional network based on an input image by applying first, second, and third stages to output a first feature map at a first resolution, a second feature map at a second resolution less than the first resolution, and a third feature map at the second resolution, respectively;
 combining at least the second and third feature maps to generate a hyper-feature corresponding to the input image;
 up-sampling the hyper-feature to the first resolution;
 generating a final set of features by combining the up-sampled hyper-feature and the first feature map; and
 providing a semantic image segmentation of the input image based on the final set of features.

16. The non-transitory machine readable medium of claim 15, wherein implementing the multi-stage fully convolutional network based on the input image further comprises:
 applying a fourth stage, prior to the first stage, to output a fourth feature map at a third resolution greater than the first resolution and a fifth stage, subsequent to the third stage in the multi-stage fully convolutional network, to output a fifth feature map at the second resolution,
 wherein combining at least the second and third feature maps to generate the hyper-feature comprises combining the second, third, and fifth feature maps to generate the hyper-feature, and
 wherein generating the final set of features comprises up-sampling a sum of the up-sampled hyper-feature and the first feature map to the third resolution and summing the up-sampled features and the fourth feature map.

17. The non-transitory machine readable medium of claim 15, wherein providing the semantic image segmentation comprises:
 applying a semantic label based convolutional layer to the final set of features to provide semantic scores;
 applying an objectness based convolutional layer to the final set of features to provide objectness scores; and
 classifying the semantic scores and the objectness scores to provide the semantic image segmentation.

18. The non-transitory machine readable medium of claim 17, wherein classifying the semantic scores and objectness scores comprises summing the semantic scores and objectness scores and classifying the summed scores.

19. The non-transitory machine readable medium of claim 17, further comprising instructions that, in response to being executed on the computing device, cause the computing device to perform semantic image segmentation by:
 classifying the semantic scores and the objectness scores to provide an objectness image segmentation of the input image, the objectness image segmentation including pixel-level object or non-object labels for pixels of the input image.

20. The non-transitory machine readable medium of claim 15, wherein the first stage comprises two convolutional layers and a max pooling layer and the second stage comprises three convolutional layers and a max pooling layer.

* * * * *